Dec. 26, 1950     E. H. NELSON     2,535,152
CAMERA CARRYING CASE
Filed June 7, 1950     3 Sheets—Sheet 1
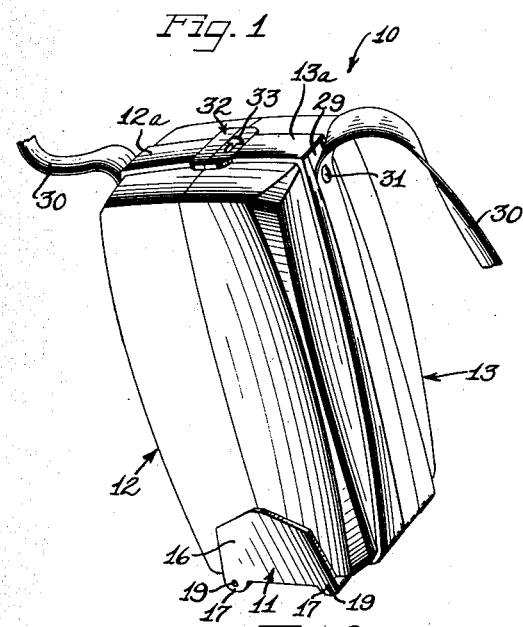
Fig. 1
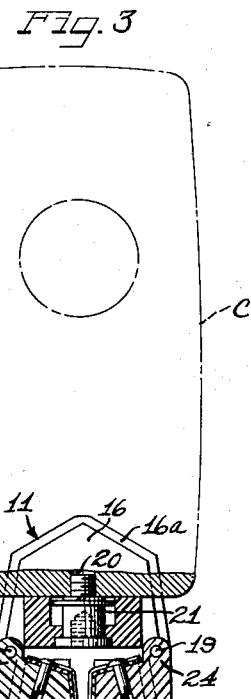
Fig. 3
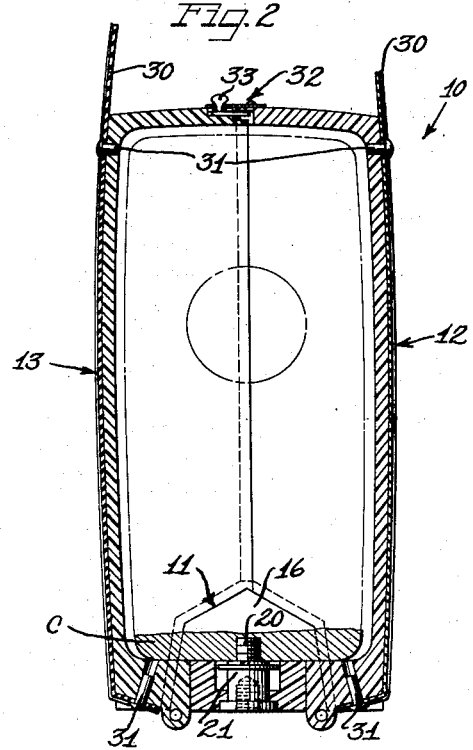
Fig. 2
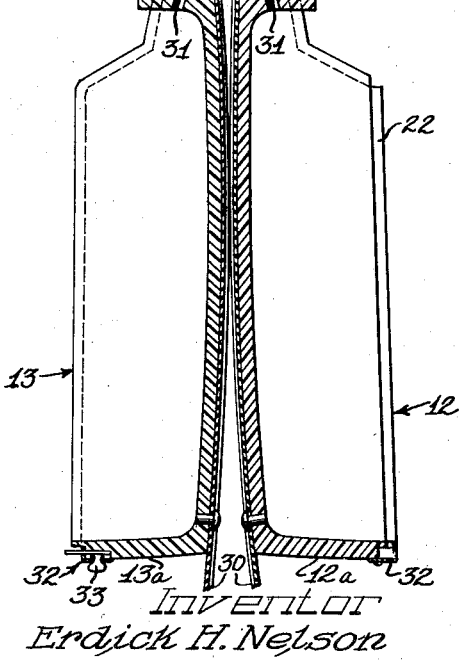
Inventor
Erdick H. Nelson
By The Firm of Charles W. Hills

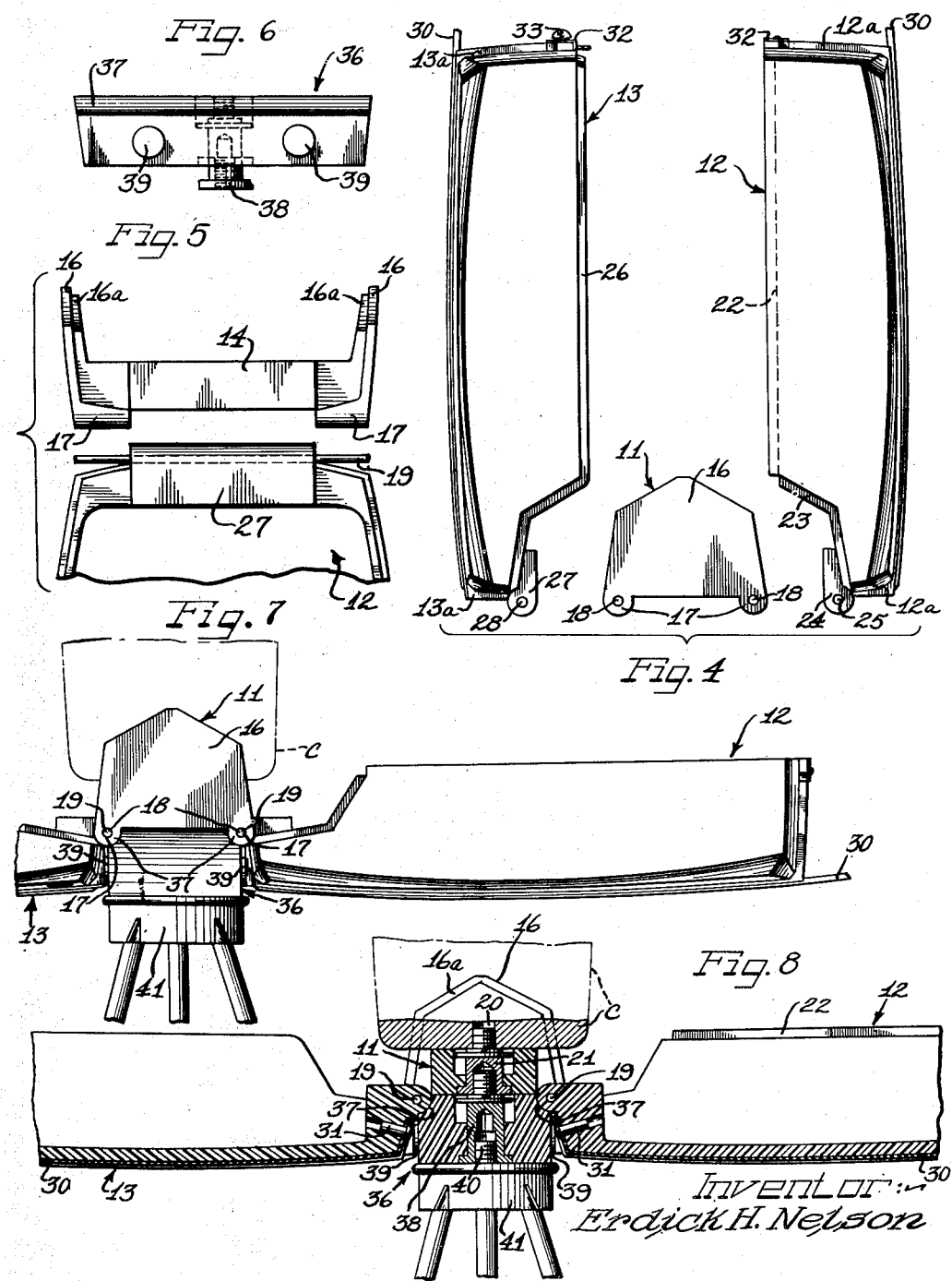

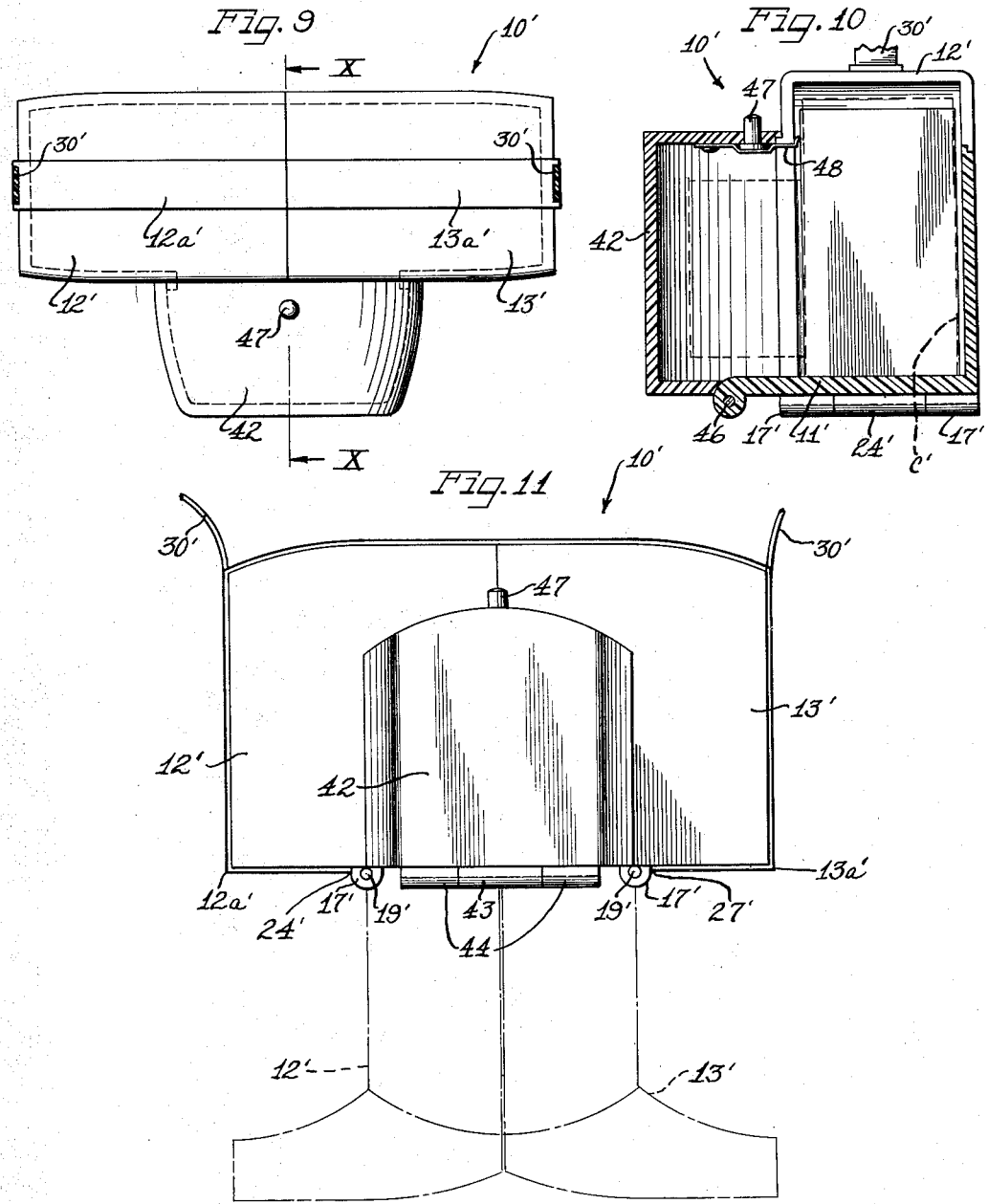

Patented Dec. 26, 1950

2,535,152

UNITED STATES PATENT OFFICE 2,535,152

CAMERA CARRYING CASE

Erdick H. Nelson, Walworth, Wis., assignor to Furnel, Incorporate, Chicago, Ill., a corporation of Illinois Application June 7, 1950, Serial No. 166,692

11 Claims. (Cl. 95—86)

This invention relates generally to a carrying case for a camera and more specifically to an improved carrying case which may be integrated in firm assembly with a camera, the case including covers pivotally hinged to a base and movable from a camera enclosing position to a retracted position wherein all portions of the camera are freely accessible and where the covers are in back-to-back relationship and form a handle by which the camera may be supported.

According to the general features of the present invention, a base member is provided having a fastener constructed to be received by the tripod connector fitting of a camera, the base member having spaced apart end portions which flank a portion of the sides of the camera. The end members have apertured boss portions which receive hinge pins pivotally mounting a par of opposed cover portions which together with the base member completely encase the camera when swung upwardly into mating relationship with one another.

In order to afford complete accessibility to all parts of the camera, the cover portions may be separated and pivotally moved to a second position where they lie in back-to-back relationship in general depending position relative to the camera. In this position, the covers form a handle by which the camera may be supported during the operation thereof.

To enhance the utility of the carrying case structure herein provided, a tripod adapter may be employed which may be interposed between the base member and a tripod so that the covers, in being pivotally moved downwardly, will engagingly abut the side walls of the tripod adapter and will be supported in a generally horizontal plane to function as a support surface for extra filters, lenses and other photographic paraphernalia used as camera accessories.

The principles of the present invention may be embodied in a carrying case for still cameras as well as for moving picture cameras. According to one preferred embodiment herein shown and described, the opposed cover portions forming the support handle may be locked in enclosure forming position by means of a latch structure taking the form of a hinged lens closure as will be explained in greater detail hereinafter.

One of the advantageous features of the present invention is the provision of a strap support operatively connected to the pivotally hinged cover members, whereby support of the case from the strap will tend to pivot the covers about the base member into enclosure forming relationship with the camera.

It is an object of the present invention, therefore, to provide a carrying case which includes closure members movable between a first position wherein a camera may be completely encased and a second position where the closure members form a handle for the camera.

Another object of the present invention is to provide a carrying case having closure members movable from a first position wherein the camera is completely encased to a second position wherein support shelves are provided upon which camera accessories may be carried.

A further object of the present invention is to provide a camera case having pivotally hinged closure members operatively connected to a strap support whereby support of the case from the strap will pivot the covers into enclosure forming relationship with the camera.

Yet another object of the present invention is to provide a camera case which may be readily and economically manufactured from a comparatively rigid material such as molded plastic or the like and having a particularly pleasing configuration.

Many other features, advantages and additional objects of the present invention will become manifest to those versed in the art upon making reference to the detailed description which follows and the accompanying sheets of drawings in which several preferred embodiments of structures incorporating the principles of my invention are shown.

On the drawings:

Figure 1 is a perspective view of a camera case according to the present invention;

Figure 2 is a cross-sectional view of the camera case shown in Figure 1, the components of the carrying case being positioned in enclosure forming relationship relative to a camera which is shown partly in phantom;

Figure 3 is a cross-sectional view with the components of the carrying case positioned to afford complete access to the camera and with the cover members of the case positioned in back-to-back relationship to form a handle by which a camera may be supported;

Figure 4 is an exploded elevational view of the case shown in Figure 1;

Figure 5 is an exploded fragmentary elevational view showing additional details of construction of the case components;

Figure 6 is an elevational view of a tripod adapter provided in accordance with the present invention;

Figure 7 is a partial elevational view showing the camera case of the present invention equipped with the tripod adapter shown in Figure 5 and mounted on a camera tripod;

Figure 8 is a partial cross-sectional view showing additional details of structure as the elements shown in Figure 7;

Figure 9 is a plan elevational view of an alternative embodiment of my invention showing a camera case for a still camera;

Figure 10 is a cross-sectional view taken on the line X—X of Figure 9; and

Figure 11 is a front elevational view of the camera case shown in Figures 9 and 10.

As shown on the drawings:

The camera case of the present invention is indicated generally by the reference numeral 10 and includes a base member 11 and a pair of closure members 12 and 13 which are of complementary similar construction, the closure members being sometimes referred to herein as a first cover member 12 and a second cover member 13.

The base member 11 includes a body portion 14 having upstanding end portions 16 spaced apart from one another to receive a camera indicated generally by the reference character C therebetween, the details of construction of which not being necessary to the understanding of the principles of this invention.

The end members 16 are each provided with a downwardly extending boss portion 17 along the four lower corner edges of the base member 11, all of the boss portions 17 being apertured as at 18 to receive a hinge pin 19, the function of which will become manifest presently.

The camera C, like most contemporary camera structures, is provided with a tripod mount attachment 20 to receive a fastener 21 of conventional construction and carried in the body portion 14 of the base member 11.

The cover 12 is a generally dish shaped element having a flanged edge portion 22 and including recessed edge portions as at 23 providing an interfitting assembly with a flanged edge 16a defined by each of the end members 16. A hinge portion 24 suitably apertured as at 25 is situated at the lowermost portion of the cover 12 and may be inserted between one pair of the opposed boss portions 17 of the base member 11 after which the hinge pin 19 may be inserted through the apertures 18 formed in the boss portions 17 and through the aperture 25 formed in the hinge portion 24, thereby hingedly mounting the cover 12 to the base member 11 for pivotal movement relative thereto.

The cover member 13 is a generally dished shaped member having recessed edge portions as at 26 which together with the flanged portion 22 of the cover 12 and the flanged portion 16a of the end member 16 of the base member 11 form an interfitting assembly. The cover 13 is also provided with a hinge portion 27 apertured as at 28 and insertable between the other spaced apart bosses 17 for hinging action on a hinge pin 19 inserted through the aperture 18 and the aperture 28, thereby permitting the cover 13 to be pivotally mounted to the base member 11.

Both of the covers 12 and 13 are provided with a substantially medially located boss 12a and 13a which substantially encircles the camera case 10, the bosses 12a and 13a lying in substantial registry with one another and forming a continuous raised portion on the outer surface of the covers 12 and 13. The bosses 12a and 13a are grooved as at 29 (Figure 1) along the side wall portions of the covers 12 and 13 to receive the ends of a strap support indicated by the reference numeral 30.

The strap support member 30 may be operatively connected to each of the covers 12 and 13 in any suitable manner, the present embodiment showing a plurality of rivets 31 passed through the strap support member 30 and received in firm assembly with respective covers 12 and 13.

The abutting portions of the bosses 12a and 13a are modified to receive a latching structure indicated generally by the reference numeral 32 to hold the covers 12 and 13 in firm assembly with one another when they are moved into a first position corresponding to an enclosure forming relationship wherein the covers 12 and 13 together with the base member 11 completely encase the camera C with which the case 10 is integrated. Finger operable means 33 are provided on the latch member situated on the cover 13 to release the latch 32 when separation of the covers 12 and 13 is necessary or desirable.

As is shown in Figure 3 the covers 12 and 13 are pivotally movable to a second position wherein the covers lie in generally dependent position relative to the camera C and in back-to-back relationship with respect to one another. In this position, the covers are completely clear of the camera C thereby affording full accessibility to all portions of the camera. In addition, the covers form a handle by means of which the camera C may be supported during the operation thereof.

One feature residing in the structural arrangement of the present invention is the fact that support of the case 10 from the strap support 30 will tend to pivot the covers 12 and 13 about the hinge pin 19 carried in the lower portion of the base member 11 into enclosure forming relationship relative to the camera C. The covers 12 and 13 actually operate as lever arms between the outermost points of support with respect to the strap support and the pivot point defined by the hinge pin 19.

Thus, if the structure of the present invention is supported about the neck of the operator by means of the strap support 30 and the covers 12 and 13 are pivoted into a handle forming position during operation of the camera C, the operator need only lower the entire structure whereupon support of the case 10 from the strap support 30 will tend to move the covers 12 and 13 into enclosure forming relationship.

Attention is invited to the fact that all of the components of the camera case thus far described are preferably made of a fairly rigid material such as a molded plastic. By the provision of such material, particularly striking color characteristics may be obtained and the physical properties of the material promote the attainability of particularly pleasing contour lines which enhance the overall esthetic appearance of the case 10 and promote the efficient development of the mechanical functions contemplated according to this invention.

In Figures 6, 7 and 8 the use of the case 10 with a tripod adapter indicated generally by the reference numeral 36 is shown.

The tripod adapter 36 preferably comprises a block of molded plastic material similar to that employed in the camera case 10, the adapter 36 being of generally rectangular configuration and the same width as the base member 11. The upper longitudinal edge portions are recessed as at 37 to receive the boss portions 17 and the hinge portions 24 and 27 of the base member 11 and the covers 12 and 13 respectively.

The adapter 36 is provided with a suitably shaped aperture to receive a conventional fastener 38 which may be threaded into the fastener 21 of the base member 11, thereby integrating the adapter 36 with the camera case 10. The side walls of the adapter 36 are provided with a plurality of spaced bosses 39 which operate as stop members to engagingly abut a portion of the bosses 12a and 13a formed on the surface of the covers 12 and 13 respectively. Thus, the covers 12 and 13 will be retained in a substantially horizontally disposed position.

The fastener 38 of the tripod adapter 36, of course, threadedly receives the stud 40 of any conventional tripod indicated generally by the reference numeral 41.

It will be readily appreciated by those versed in the art that the horizontally extending position of the covers 12 and 13 is particularly desirable when the camera C is carried on the tripod 41 since the covers 12 and 13 form shelves upon which various filters, lenses, flash bulbs, and other photographic paraphernalia commonly employed as camera accessories may be placed during various phases of camera operation. moreover, despite the added utility of the covers 12 and 13 through their shelf forming capacity, the camera C is completely cleared by both of the covers 12 and 13 thereby affording full accessibility to all portions thereof.

In Figures 9, 10 and 11, the principles of the present invention are shown in their application to a camera case indicated generally by the reference numeral 10' for a still camera, for example, a conventional 35 mm. camera of the type adapted to take snapshots.

The camera case 10' includes a base member 11' and a first cover member 12' and a second cover member 13'.

The base member 11' has spaced boss portions 17' which receive the hinged portions 24' and 27' of covers 12' and 13' therebetween, the boss portions 17' and the hinged portions 24' and 27' being apertured to receive a hinge pin 19' so that the covers 12' and 13' may be moved from a first position wherein a camera C' is completely encased (Figures 9 and 10) to a second position wherein the covers 12' and 13' are in generally dependent relationship relative to the camera C' and form a handle by means of which the camera C' may be supported (phantom outline shown in Figure 11).

The covers 12' and 13' may be latched in enclosure forming relationship by means of a latching arrangement which, in this particular embodiment, takes the form of a lens cover 42 having a hinge portion 43 received between a pair of spaced bosses 44 formed on the base member 11', the hinge portion 43 and the bosses 44 being apertured to receive a hinge pin 46, whereby the lens door 42 may be swung clear of the lens provided on the camera C' or may be pivotally moved into locking relationship with the covers 12' and 13'. A finger operable button 47 cooperable with a spring clip 48 fastened to the lens door 42 is provided to assist in retaining the covers 12' and 13' in assembled relationship.

The covers 12' and 13' may be further provided with boss portions 12a' and 13a', the boss portions being grooved to receive a strap support 30' operatively connected to the covers 12' and 13' in a manner similar to that previously described.

Although I have resorted to detail in the description of the various structural embodiments of my invention, it should be understood that I wish to embody within the scope of this patent all such modifications as reasonably and properly come within the scope of my contribution to the art.

I claim as my invention:

1. A carrying case for a camera comprising a base member having fastening means connectable with said camera, closure members hinged to said base for pivotal movement between a first position wherein said closure members are positioned uprightly on said base member and together with said base member form a camera enclosure and a second position wherein said closure members generally depend from said base member and together with one another form a handle with which to support a camera connected to said base member, latching means to lock said closure members in said first position, said latching means including a lens enclosing door pivotally mounted on said base member to swing through a plane generally normal to the plane of movement of said closure members from a first position wherein said door cooperates with said closure members to latch same in closed position and a second position wherein said door is swung clear of the camera.

2. A carrying case as defined in claim 1 and strap means, the ends of said strap means being respectively connected to each of said closure members, whereby said closure members together with said base member and said strap means form a closed loop.

3. A carrying case as defined in claim 2 wherein said base member is arranged to project into said closed loop, whereby support of said carrying case from said strap means with said camera positioned uprightly on said base member will pivot said closure members into said first position.

4. A carrying case for a portable hand manipulated camera comprising a base member having fastening means to removably receive said camera in assembly with said base member, a first rigid cover and a second rigid cover, each of said covers having a hinged connection to said base member in spaced apart relationship to one another and being pivotally movable relative to the base member, each of said covers also including marginal flange portions arranged to abuttingly engage one another when said covers are pivotally moved to a first upright position on said base member, said covers together with said base member when in said first upright position completely encasing the camera assembled on said base member, said covers being pivotally movable to a second position in generally dependent relationship to said base member and in generally back-to-back abutment with each other, said covers together with one another forming a unitary handle grip arranged to support the camera assembled on said base member, the adjacent marginal flange portions of said covers being adapted to be embraceably grasped by the hands of the camera manipulator.

5. A carrying case for a portable hand manipulated camera comprising a base member having fastening means to removably receive said camera in assembly with said base member, a first rigid cover and a second rigid cover, each of said covers having a hinged connection to said base member in spaced apart relationship to one another and being pivotally movable relative to the base member, each of said covers also including marginal flange portions arranged to abuttingly engage one another when said covers are pivotally moved to a first upright position on said base member, said covers together with said base member when in said first upright position completely encasing the camera assembled on said base member, said covers being pivotally movable to a second position in generally dependent relationship to said base member and in generally back-to-back abutment with each other, said covers together with one another forming a unitary handle grip arranged to support the camera assembled on said base member, the adjacent marginal flange portions of said covers being adapted to be embraceably grasped by the hands of the camera manipulator, and mating latching means carried by each of said covers to lock same in said first upright position.

6. A camera case made of a substantially rigid molded plastic material and comprising a base member having a connection member to be attached to a camera, a pair of generally dished covers pivotally hinged to said base member and together therewith forming a casing to enclose a camera attached to said connection member, said covers being pivotally displaceable into generally dependent relationship to said base member to afford full access to the camera and generally abutting one another thereby to form a rigid handle with which to support the camera connected to the base member, said covers constructed to have substantial portion thereof embraceably grasped by the hands of a camera operator.

7. A carrying case for a camera comprising a base having a body portion with fastening means, a camera connected to the base by said fastening means, apertured boss means on the lowermost portions of the base, a first cover and a second cover each having an apertured flange means at one end thereof cooperable with said boss means, a hinge pin extending through each of said boss means and through each of said flanges, said first and second covers being pivotally movable from a first position wherein said covers are positioned uprightly on said base and together with said base form a casing for said camera to a second position wherein said covers lie in generally depending relationship to said base and abut one another to form a handle for support of said camera, said handle being substantially embraceable by the hands of a camera operator.

8. A carrying case for a camera comprising a camera supporting base portion, a first cover and a second cover each having a hinged connection to said base portion and being pivotally movable relative thereto to abuttingly underlie said base portion, thereby to form a unitary handle grip for use in operating the camera, said covers together with one another and with said base portion forming a camera enclosure, and a strap means, each of said covers having an end of said strap means firmly connected thereto, said strap means in combination with said first and second covers and together with said base portion forming a closed loop, said base portion extending into the closure of said loop, whereby support of said case from said strap means with the base portion positioned uprightly will pivot said covers about said base portion into enclosure forming relationship with a camera supported on said base portion.

9. A carrying case for a camera comprising a camera supporting base portion, a first cover and a second cover each having a hinged connection to said base portion and pivotally movable relative thereto, said covers together with one another and with said base portion forming a camera enclosure, and a strap means, each of said covers having a strap-receiving portion arranged to receive one end of said strap means, the ends of said strap means being firmly connected to each of said covers to form a closed loop together with said base portion and said first and second covers, said base portion arranged to project into said closed loop, whereby support of said case from said strap means with the base portion positioned uprightly will pivot said covers about said base into enclosure forming relationship, said first and second covers adapted to be pivotally moved into a dependent relationship with said base portion and with said strap-receiving portions in abutment, thereby to form a unitary handle grip for use as a support in operating the camera.

10. A carrying case for a camera comprising a base portion, a first cover and a second cover, said covers each comprising a generally cup-shaped receptacle-like element, each of said covers including a hinge portion pivotally connected to said base portion, the covers being pivotally movable and abutting one another when positioned uprightly on said base portion as well as when depending from said base portion, thereby forming together with the base portion a camera enclosure when in upright position and a unitary handle grip when in dependent position, the covers having a boss substantially encircling a portion of said case along opposed side wall faces of said covers, said boss constituting a strap receiving means, a carrying strap having portions thereof received by said boss and being firmly connected to said cover, and latch means carried by said covers to lock said covers in enclosure forming relationship.

11. A carrying case for a portable camera comprising a base member having fastening means connectable with said camera, closure members hinged to said base for pivotal movement between a first position wherein said closure members are positioned uprightly with respect to said base member and together with said base member form a camera enclosure and a second position wherein said closure members generally depend from said base member and abut one another to form a unitary handle, the closure members when in dependent position adapted to be hand gripped and arranged to be embraceably grasped to support the camera, and latching means to lock said closure members in said first position.

ERDICK H. NELSON.

REFERENCES CITED

The following references are of record in the file of this patent:

UNITED STATES PATENTS

| Number | Name | Date |
|---|---|---|
| D. 160,819 | Lustig | Sept. 19, 1950 |
| 2,172,348 | Githens | Sept. 12, 1939 |
| 2,249,116 | Corless | July 15, 1941 |
| 2,290,307 | Wicker | July 21, 1942 |
| 2,481,106 | Gold | Sept. 6, 1949 |

FOREIGN PATENTS

| Number | Country | Date |
|---|---|---|
| 600,954 | Great Britain | Apr. 25, 1948 |